Feb. 12, 1935.   B. RAMSDEN   1,990,918
MEANS FOR PREVENTING THE FORMATION OF SCUM OR SKIN
ON THE TOP OF MILK OR OTHER LIQUIDS
Filed July 1, 1932
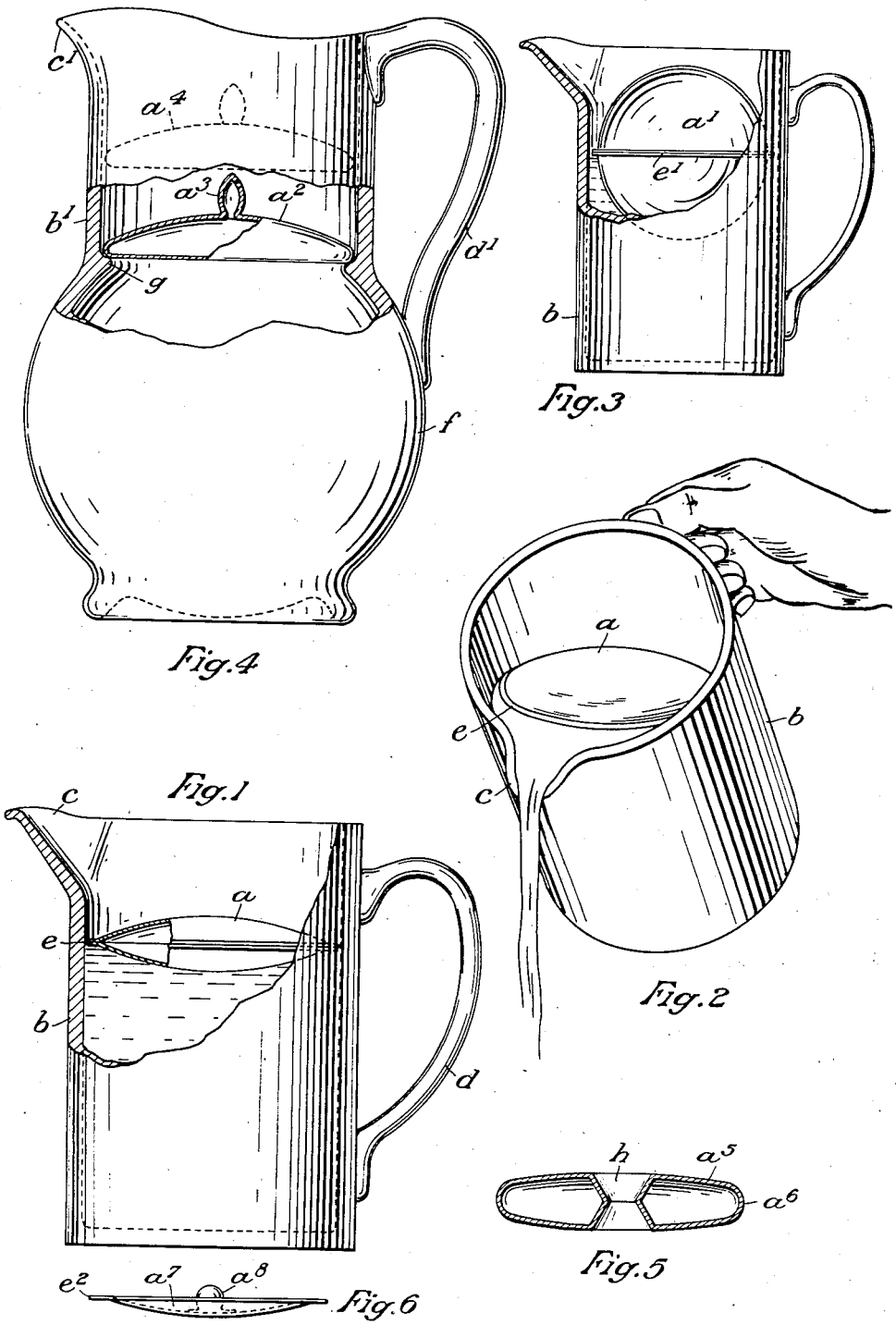
INVENTOR.
Benjamin Ramsden Patented Feb. 12, 1935

1,990,918

UNITED STATES PATENT OFFICE 1,990,918

MEANS FOR PREVENTING THE FORMATION OF SCUM OR SKIN ON THE TOP OF MILK OR OTHER LIQUIDS

Benjamin Ramsden, Shalford, England

Application July 1, 1932, Serial No. 620,554
In Great Britain August 12, 1931

4 Claims. (Cl. 65—31)

This invention relates to means for preventing the formation or presence of scum or skin on the top of milk or other liquid in vessels, after boiling or strong heating, and more particularly to float devices adapted for use with milk jugs or other containers from which the milk can be served after boiling or heating.

It has been ascertained that the presence of a float on the surface of milk in a container, fitting within the container sufficiently closely to exclude practically all the air, will prevent the formation of a skin or scum on the milk, after boiling or heating. Such a skin or scum, which commonly forms when milk is brought up to the boil in the ordinary way, with access of air to the surface, is of course highly objectionable when the hot milk is to be used as an ingredient in hot drinks and for other uses.

Such a float, to be effective for the purpose desired, must cover substantially all the surface of the milk in the jug or other vessel, and it should be so constructed as to float freely on the milk when the jug or container is tilted for pouring as well as when it is upright. I find that a float with straight vertical edges of substantial length, when used in a vessel with parallel sides, such as an ordinary jug, will jam when the jug is inclined for pouring, unless it is made substantially smaller than the inside diameter of the jug, in which case a considerable portion of the surface of the milk would be uncovered, destroying the effectiveness of the device.

I overcome these difficulties by providing a float which has no straight vertical edges, or an edge so slight in its vertical dimension as to overcome the danger of jamming. This may be accomplished by providing rounded edges, or a thin rim or edge portion at or about the liquid level, so that the float can float freely on the surface of the milk or other liquid at any angle whilst covering substantially the whole surface, and the milk or other liquid can be poured out with the float still in position.

The device may be of lenticular or plano-convex or concavo-convex or other desired shape in cross section, or it may be, for example, of biscuit shape with a rounded peripheral edge. Various shapes may be used, so long as the float fits within the container with a diameter or other lateral dimension slightly smaller than that of the interior of the vessel with which it is to be used, so that the whole surface area of the liquid in the vessel will be substantially covered, while giving the float perfect freedom to follow any alteration of level of the liquid. I find that with the slight necessary clearance between the edge of the float and the interior of the vessel the air is excluded practically completely from the surface of the liquid, when the latter, such as milk, is heated sufficiently, say, to about 180° F., because the bubbles from the hot or boiling liquid form a gaseous seal between the edges of the float and the wall of the container. With this construction not only can the liquid be poured from the vessel without interference from the float, but also, if desired, a person may drink direct from the vessel without being unduly inconvenienced by the presence of the float. I likewise note that with the described construction the float will not float out of the container when the liquid is poured, but will either maintain its position upon the surface within the vessel or will engage at opposite points of the container, about which it will tend to pivot.

An object of my invention is the provision of improved devices of the character indicated, the invention comprising improved float devices and also the combination of such devices with vessels of a character adapted to coact therewith. Other objects comprise the provision of various improved details of construction, all as will more fully appear hereafter.

In order that the invention may be more fully understood, attention is hereby directed to the accompanying drawing, forming part of this application, and illustrating, by way of example, certain embodiments of the invention. In the drawing:

Figure 1 is a side elevation partly broken away and shown in section, of one construction of float device and a jug for use therewith.

Figure 2 is a perspective view illustrating the position of the float shown in Figure 1 when the jug is tilted for pouring.

Figure 3 is a view, partly in elevation and partly in section of another construction of float in the form of a ball and a jug for use therewith.

Figure 4 is a view, partly in elevation and partly in section of yet another construction of float and jug therefor.

Figure 5 is a cross-section of a modified construction of float; and

Figure 6 is an elevation of yet another modified construction.

Referring to Figure 1, the float $a$ is of lenticular shape in cross-section, and is made of porcelain, earthenware, metal or other appropriate material and is suitably hollow, as shown. The device may be solid, however, in the case of a material being used which will float on the liquid. In any case, it is advantageous to provide the float with a smooth surface for facilitating cleaning thereof, and one which is substantially non-porous, and impervious to the milk or other liquid. The vessel $b$ comprises a body part $b'$ having parallel sides, a spout $c$ and a handle $d$. The jug may be cylindrical or of circular cross-section as shown to permit vertical movement of the float $a$ therein or it may be elliptical in cross-section or of other suitable cross-section, the float being in all cases of similar shape in plan. The jug may also be provided with markings to indicate the contents by the liquid level or levels. The float $a$, of circular shape in plan, is of slightly smaller diameter than the internal diameter of the vessel $b$. The float is thus capable of floating in the vessel and excludes air from practically entire surface-area of the liquid in the vessel. As shown, the float $a$, of lenticular shape in cross-section, is composed of two similar portions connected at their flat edges, forming rims to provide a more or less thin peripheral edge $e$ which is adapted to coincide with or float just above the level of the liquid. It will be seen that the float offers no obstruction to pouring (as exemplified in Figure 2) and does not jam in the vessel. When the jug is inclined for pouring the float will not pass away with the milk but makes contact at two opposite points of the jug almost as soon as pouring commences, resuming its original position when the jug is returned to an upright position. There is, therefore, no necessity to remove the float from the jug when pouring. The float also serves as a cover to prevent flies or foreign matter coming into contact with the milk. If desired, the float $a$ may be provided with a knob or handle as shown at $a^3$ in Figure 6.

Referring to Figure 3, it will be seen that the float $a$ is spherical and may be of such a diameter as to nearly make contact with the inside of the jug. In any case it has such a specific gravity as causes it to float with its largest horizontal periphery immediately above the level of the liquid. If desired and as shown this float is smaller and provided with a rim or rims like that marked $e$ in Figures 1 and 2 and weighted so that the rim is immediately above the liquid level. The jug $b$ shown is as described with reference to Figures 1 and 2.

As shown in Figure 4, the float $a^2$ is of plano-convex shape in cross-section, the upper convex surface being formed with a knob $a^3$, handle or the like, so that the device may be easily handled. The float may be made of any suitable material, such as earthenware and is preferably hollow, but it may be made solid if the material has such a specific gravity as will allow it to float in the liquid. The vessel comprises a cylindrical neck $b'$, spout $c'$, a handle $d'$, and a part-spherical bowl $f$. At the bottom of the neck $b'$, there is an internal ledge $g$ on which the float $a^2$ may rest when the level of the liquid is too low to support the float. A restriction or a number of projections may be provided instead of the ledge $g$ for preventing the float descending into the body of the vessel when the level falls below the ledge $g$ or the like. This form of jug may be used where it is intended that the liquid shall remain in the jug till cool and where the quantity of the liquid poured into it in the first instance is sufficient to bring the float into operation, say into the dotted position at $a^4$. In this position the float excludes air from practically the entire surface-area of the liquid in the jug and prevents the formation of skin there but, obviously, this would not occur if the float were resting on the ledge $g$ and the liquid level were below it.

Obviously, any of the floats described and shown may be used with any jug, beaker or other vessel having parallel sides and of a shape conforming to the shape of the float.

According to the modified construction shown in Figure 5, the float $a^5$ is of biscuit-shape in cross-section having substantially flat top and bottom surfaces and a rounded edge $a^6$. The float may be provided with an aperture $h$ thus allowing the insertion of a stirring device for agitating or mixing some liquids, such as cocoa or chocolate. The aperture may be disposed eccentrically if the float be provided with a knob as in Figure 4 so as to enable it to assume its proper horizontal position when floating and may be of double truncated conical section with the waist or constricted part at liquid level. Or the knob may be hollow forming an extension above the aperture which may then be central.

As shown in Figure 6, the float is in the form of a pan $a^7$ with a flat peripheral rim or edge $e^2$ and a knob or handle $a^8$ which, if hollow, must be hermetically sealed all round where it is joined to the float so as to prevent the entry of liquid which, if it gained access to the interior would become sour or decomposed.

I claim:

1. A serving pitcher for preventing the formation of scum on the surface of liquid contained therein, comprising a body portion having parallel walls and a float adapted to rest upon and substantially cover the surface of the liquid confined by said walls, said float having thin marginal edges adjacent said walls whereby the body portion of said vessel may be tilted for pouring while said float remains in a free floating horizontal position on the surface of said liquid.

2. A serving pitcher for preventing the formation of scum on the surface of a liquid therein, comprising a cylindrical body portion having normally vertically disposed walls, a circular float of slightly less diameter than the internal diameter of said body portion adapted to rest upon and substantially cover the surface of the liquid therein, said float having narrow tapering marginal edges whereby the body portion of said vessel may be tilted for pouring while said float remains in horizontal free floating position.

3. A serving pitcher for preventing the formation of scum on the surface of liquid contained therein, comprising a body portion having normally vertically disposed walls and a uniform cross-sectional area and a float having an area slightly less in the cross-sectional area than the body portion of said vessel, said float adapted to rest on the surface of the liquid and substantially cover the same, said float having thin marginal edges whereby said float will remain in horizontal free floating position when said vessel is tilted for pouring.

4. A serving pitcher for preventing the formation of scum on the surface of liquid contained therein, comprising a cylindrical body portion having normally vertically disposed walls, an inwardly extending ledge at the base of said walls, a float of slightly less diameter than said body portion adapted to rest upon the surface of said liquid when the level thereof is above said ledge and to rest on said ledge when said liquid level is below said ledge, said float having relatively thin marginal edges whereby said float will remain in horizontal free floating position when said vessel is tilted.

BENJAMIN RAMSDEN.